H. O. Elmer,
Saw-Gummer,
Nº 19,244.
Patented Feb. 2, 1858.
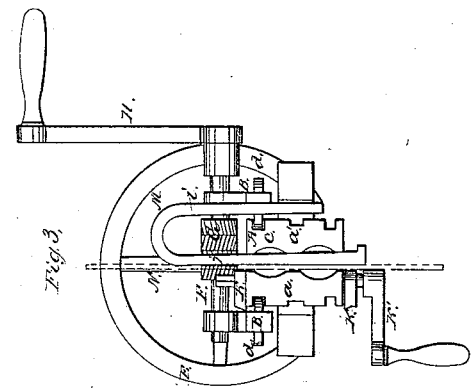
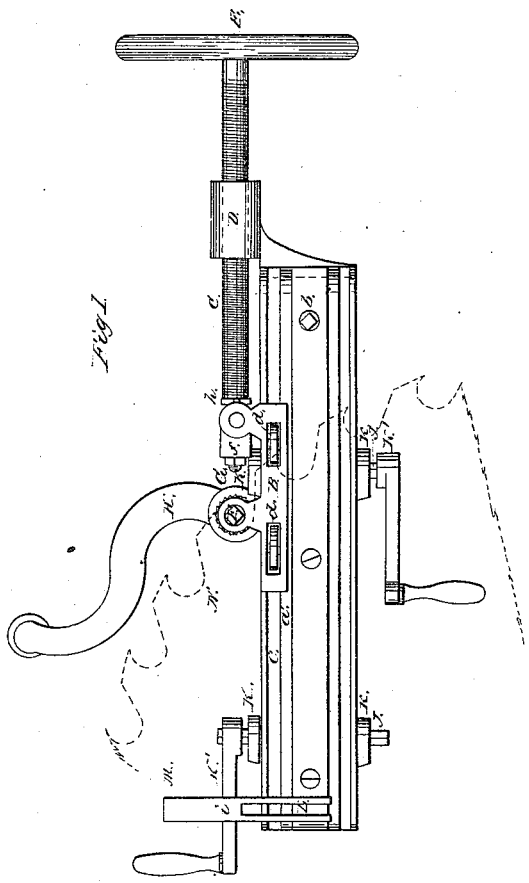
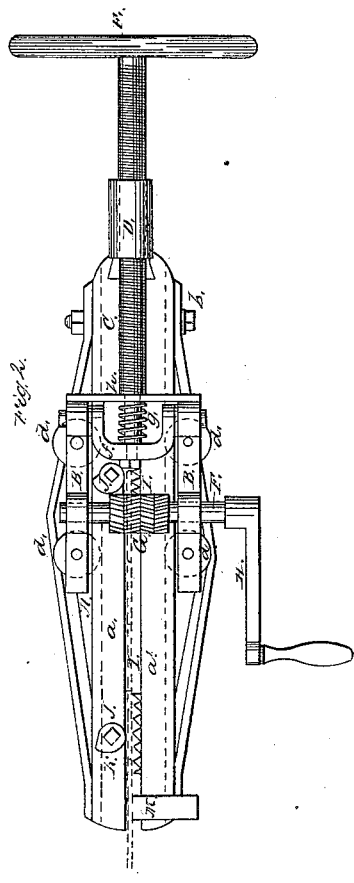

UNITED STATES PATENT OFFICE.

HOSEA O. ELMER, OF MEXICO, NEW YORK.

GUMMING AND JOINTING SAWS.

Specification of Letters Patent No. 19,244, dated February 2, 1858.

*To all whom it may concern:*

Be it known that I, HOSEA O. ELMER, of Mexico, in the county of Oswego and State of New York, have invented a new and useful Improvement in Machines for Filing, Gumming, and Jointing Saws; and I do hereby declare that the following is a full, clear, and exact description of the same, reference being had to the annexed drawings, making a part of this specification, in which—

Figure 1, is a side view of my improvement. Fig. 2, is a plan or top view of ditto. Fig. 3, is an end view of ditto.

Similar letters of reference indicate corresponding parts in the several figures.

This invention relates to an improvement on a machine formerly patented by me and bearing date Sept. 28, 1852. The improvement consists in so constructing the bed or frame of the machine and providing it with clamps that it may be readily attached to the saw and adjusted in the proper positions, and applied with equal facility to either reciprocating or circular saws.

To enable those skilled in the art to make and use my invention I will proceed to describe fully its construction and the way in which it is applied and operated.

A represents the bed or frame of the machine. This bed or frame is composed of two parallel metal bars $(a)$ $(a')$ connected at one end by a bolt $(b)$ said bolt passing through a block which determines the distance or width of space between the bars $(a)$ $(a')$. These bars $(a)$ $(a')$ may be constructed in any proper manner to insure lightness with the necessary degree of stiffness or strength.

B, B, represent two bars, each of which is provided with two friction rollers $(d)$ $(d)$. The friction rollers of each bar fit in grooves $(e)$ which are made longitudinally one in the outer side of each bar $(a)$ $(a')$, said grooves extending the whole length of the bars. The front ends of the bars B, B, are connected by a curved traverse bar $(f)$ in which the end of a screw rod C, is fitted and allowed to turn freely. A spiral spring $(g)$ is placed on the end of said rod C, and confined between the bar $(f)$ and a plate $(h)$ attached to said bar, the curve of the bar $(f)$ forming a space to receive the spring. The rod C passes through a nut D attached to the front end of the bars $(a)$ $(a')$ and the outer end of the screw rod is provided with a hand wheel E.

F, is a shaft which is placed transversely on the bars B, B. This shaft has a cutter G placed upon it. The cutter is cylindrical, the cutting edges being of zig-zag form as shown in Fig. 2, and is frequently termed a bar cutter. A crank H is placed on one end of the shaft F, for turning the shaft and cutter.

It will be seen that by turning the hand wheel E the bars B, B, and cutter G may be moved back and forth on the bed or frame A.

To the inner side of the bar $(a')$ there are attached two corrugated or pointed plates I, I, see Fig. 2 and through the bar $(a)$ two shafts J, J, pass said shafts having each a cam K on its upper and lower end. One shaft J, projects a short distance above the cam at its upper end, and the other projects a short distance below the cam at its lower end, said ends being of square form so as to receive a crank or wrench K', see Fig. 1. To the back end of the bar $(a')$ and on its outer side there is attached a dove-tail projection L, and M, is a bow or curved bar which serves as a guide, its two sides $(i)$ $(j)$ being parallel with each other. The side $(i)$ of the bow or guide is slotted vertically and is fitted on the projection L, and the side $(j)$ is of slightly taper form and fitted between the ends of the bars $(a)$ $(a')$. It will be seen that the inner ends of the bars $(a)$ $(a')$ are not connected in any way.

N is a portion of a circular saw, shown in red.

The implement is used as follows:—The bed or frame A is passed on the saw, the saw fitting in the space between the bars $(a)$ $(a')$ and the bed is firmly clamped to the saw by turning the shafts J so that the cams K will bind or press the saw firmly against the corrugated or pointed plates I, I. Previous to adjusting the bed or frame A upon the saw N, the bow or guide M is adjusted so that its side $(j)$ will prevent the teeth of the saw from coming in contact with the plates I, I, the side $(j)$ it will be seen is by the inner side of the bar $(a')$ and in the same plane with the plates I, and consequently it serves as a guard or protection to the saw teeth preventing them from coming in contact with the plates I and allowing the bed or frame to be quickly moved or adjusted upon the saw and thereby facilitating the work of gumming and jointing to a very considerable degree. The operation of the cutter G is much or quite the same as that in my former patent, previously alluded to, the cutter being rotated by turning the crank H with one hand the cutter and bars B B being moved rectilinearly by turning the screw rod C with the other, the under and upper surfaces of the teeth being acted upon by the cutter so that the teeth will all be of uniform size and the spaces between also made uniform. I would remark however that in the patent referred to the carriage on which the cutter is placed is operated by a rack and pinion. I would further remark that by this mode of constructing the bed or frame the implement may be adjusted to either circular or reciprocating saws, as the inner or back end of the frame or bed is open to receive the saw the width of the saw not being as formerly confined to the length of the bed or the slot therein.

I do not claim the rotary bar cutter G, placed on a rectilinearly moving frame or carriage for such device has been previously used; but

Having thus described my invention, what I claim as new and desire to secure by Letters Patent is,

Constructing the bed or frame A of two parallel bars ($a$) ($a'$), connected at their outer or front ends by a bolt ($b$) and having a suitable space allowed between them, when said bed thus constructed is used in connection with the guard or guide M, attached to their inner ends and arranged as shown for the purpose of preventing the teeth of the saw being injured by coming in contact with the plates I, I, as the bed is adjusted upon or to the saw as described.

HOSEA O. ELMER.

Witnesses:
JNO. A. FORT,
PERLEY J. BABCOCK.